Figures 1, 2, 3:
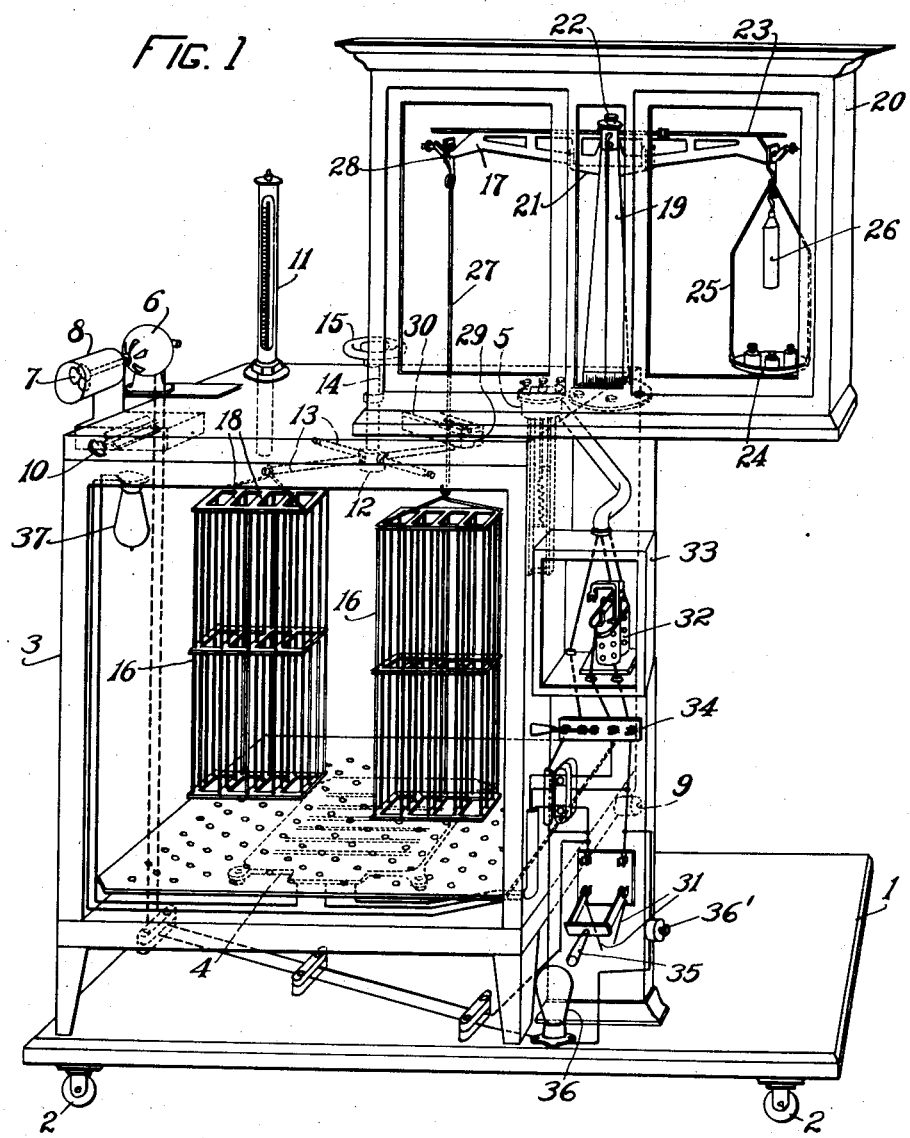

C. J. EMERSON.
TEXTILE CONDITIONING INSTRUMENT.
APPLICATION FILED MAY 10, 1913.

1,089,826.

Patented Mar. 10, 1914.

WITNESSES
Ida S. Clement.
George B. Rawlings.

INVENTOR
Charles J. Emerson,
BY
ATTY.

UNITED STATES PATENT OFFICE.

CHARLES J. EMERSON, OF PROVIDENCE, RHODE ISLAND.

TEXTILE-CONDITIONING INSTRUMENT.

1,089,826.     Specification of Letters Patent.     Patented Mar. 10, 1914.

Application filed May 10, 1913. Serial No. 766,719.

*To all whom it may concern:*

Be it known that I, CHARLES J. EMERSON, a citizen of the United States, residing at Providence, county of Providence, State of Rhode Island, have invented certain new and useful Improvements in Textile-Conditioning Instruments, of which the following is a specification.

This invention relates to the weighing of samples such as yarns, hemp, cotton and of light materials and particularly to the determination of the constant weight for the purpose of determining the original moisture content of the sample.

This determination of moisture content of samples of textile materials where large quantities of material are to be purchased is of very great importance as the value per pound depends upon the percentage of water present. The variation in moisture between products of different properties has always been a source of error and rapid accurate weighing is necessary to eliminate uncertainty, waste and loss. To the end therefore of producing an instrument which will determine the moisture content of textile raw materials and textile materials in process of manufacture, I have devised my present instrument. In it I combine a drying oven with a weighing device, the latter mounted in such relation that the tested materials can be weighed by the same, while in the oven. The temperature of the oven is automatically controlled by a thermostat to obtain a uniform temperature condition, thus insuring complete drying of the samples without over-heating or scorching. The time required for conditioning is reduced by the use of a motor-driven fan, which artificially accelerates the circulation of the heated air being supplied to the oven.

The rapidity of drying the moisture from the samples is increased by the use of baskets or containers of novel construction. These baskets are designed with partitions which so arrange the material that the maximum thickness of the same will not be sufficient to retard the expelling of the moisture. The capacity of the instrument is increased and the testing thus facilitated by the use of a plurality of baskets mounted on a revoluble support. This support is so arranged as to bring each basket successively in position directly below the end of the beam of the weighing device without changing the position of the weighing device.

These and other advantages which will be more particularly pointed out in the specification which follows are secured by the use of a testing instrument constructed in accordance with my invention.

In the drawings which form a part of this specification, I have shown as an illustrative embodiment an instrument of this class which I have found well adapted to the requirements of the trade.

Throughout specification and drawings like reference numerals are employed to indicate corresponding parts, and in the drawings: Figure 1 is a perspective view of a testing instrument in accordance with my invention, certain parts being removed to illustrate details of construction. Fig. 2 is a view of one of the containers detached from its support illustrating its use as a reel, and Fig. 3 is a detail of the free end of one of the revoluble arms from which the containers are suspended.

The testing instrument thus illustrated comprises a supporting base 1 mounted on suitable casters 2, whereby the apparatus as a whole may be moved from place to place.

The oven is preferably a rectangular box 3 mounted on the base and having double walls filled with a non-conducting material. Entrance to the oven is had by a door (not shown) at the front. An electric heater 4 is placed at the bottom of the oven. This heater may be of any approved type and is controlled by a thermostat 5 secured to a wall of the oven and regulating the current supplied to the heater. This thermostat automatically controls the generation of heat in the oven and insures a constant temperature therein.

A motor 6 mounted on the top of the oven drives a fan 7 mounted in an exhaust pipe 8 to induce a circulation of air through the oven. This artificial circulation of the heated air materially reduces the time required in making a test.

Cold air enters through an opening 9 in the bottom of the oven and is drawn by said fan through a false bottom, around the electric heater and through a perforated distributing plate into the oven. After circulating through the oven the moisture laden air is expelled from the upper chamber by the fan. The exit of this air is controlled by a damper 10 in the exhaust pipe. This artificial circulation of air insures uniform and rapid drying conditions and the exact temperature of the air within the oven may be read upon the thermometer 11 as shown.

Mounted at the top of the oven is a revoluble support 12 in the nature of a spider having a plurality of radial arms 13 extending from the hub thereof. The shaft 14 carrying said spider is rotated by means of a hand wheel 15. This hand wheel is preferably numbered to correspond with the radial arms, which arms are effective when rotated to present successively, their containers 16 directly below the end of the rider beam 17 of a weighing balance, the construction of which will be more fully described hereinafter. The containers 16 are adapted to receive samples of the materials to be tested for moisture. The free end of each spider is grooved circumferentially as shown to receive the eye of a supporting wire for the containers which depend therefrom, and is slotted longitudinally at 13' to permit entrance of the hooked end of a rod 27 depending from the rider beam of the balance to raise or detach the container. These containers are preferably made of wire and are of rectangular section. They are divided by suitable partitions 18 into compartments, as shown, in order to receive and dry the material to the best advantage. The partitions therefore so arrange the material that the maximum thickness thereof will not be sufficient to retard the expelling of the moisture. Where the nature of the materials require, they are wound upon the baskets from one end to the other, the baskets thus serving as reels to receive the fiber, as shown in Fig. 2.

The weighing device for determining the gross and net weights of the samples is a balance of the analytical type. These balances are supported upon an independent pedestal 19 and are inclosed in a glass case 20. They have three knife edges and a beam release placed so that when the balances are not in use, the beam may be lifted from the knife edges and supported thereon. This beam release is in the nature of a support 21, forked at its upper end to support the rider beam 17 and controlled by a set screw 22.

The rider for the rider beam is indicated by the numeral 23. At one end of said beam a scale pan 24 is attached by means of a stirrup 25. The depending counter weight 26 just balances the weight of the baskets so that only the material in the baskets is weighed. From the other end of the rider beam a rod 27 is suspended from the rider stirrup 28. This rod passes through a small opening 29 formed in the top of the oven and provided with a sliding cover 30. Said rod is hooked at its free end as shown to receive the eye of the basket support. This construction permits weighing of the baskets within the oven.

The electrical connections for supplying and controlling the heat to the oven and for operating the motor are of the usual type and need not necessarily be considered in detail herein. The current is supplied from the feed wires 31 to the binding posts of a knife switch 35, from thence it is led to a double solenoid switch 32, mounted in a case 33 supported on the pedestal, and controlled by the thermostat 5 which is wired up in circuit therewith. This thermostat 5 and switch 32 prevent temperature variation in the oven between certain limits by throwing on and off the current when these limiting temperatures are reached. The supply of current to the electric heater is turned on and off by a knife switch 34 and the supply to the motor by the said knife switch 35. I preferably wire up in the circuit to the motor, an incandescent bulb 36 controlled by a snap switch 36' and from the electric heater I extend an auxiliary circuit in which a second incandescent bulb 37 is included. Either direct or alternating current may be used to operate.

The operation of my testing instrument is substantially as follows: The materials to be conditioned are placed in the baskets and first weighed at atmospheric temperature by hooking them to the right hand end of the rider beam. Each basket is then hung upon an arm of the revoluble support in the oven. The electric current is then turned on to the heater. When the operating temperature is reached the fan is started. When sufficient time has elapsed (depending upon the character of the material and the amount of moisture) to completely expel the moisture, the net fiber weights are taken by weighing the baskets in the oven. This is done by turning the baskets successively in position and hooking them to the left side of the scale. Inasmuch as there are a plurality of baskets (four being shown in the drawing) a number of separate tests may be made at the same time and the oven may be operated continuously by inserting a new lot at the completion of one set of tests.

It will thus be observed that provision is made for the continuous operation of the instrument and that its capacity for testing is limited only to the size of the oven. It will also be noted that the thermostat automatically controls the temperature while the motor-driven fan is effective to artificially accelerate the circulation of the heated air, thus expediting the drying operation.

Various modifications in the form and number of the baskets, the arrangement of the revoluble support and the type of weighing device may obviously be resorted to, all within the limits of the appended claims.

What I, therefore, claim and desire to secure by Letters Patent is:—

1. In an instrument of the class described, a sample drying oven, plural sample supports in said oven, a weighing device associated with said oven and having a sample engaging member extending therein, and means for selectively presenting any one of said samples supports to said weighing device.

2. In an instrument of the class described, a sample drying oven, a sample support in said oven comprising a spider having radial arms, a weighing device associated with said oven and having a sample engaging member extending therein, and an external manipulator operatively connected to said spider for selectively presenting any one of said sample supports to said weighing device.

3. In an instrument of the class described, a sample drying oven, plural sample supports in said oven, a weighing device associated with said oven and having a sample engaging member extending therein, and externally controllable means for selectively presenting any one of said sample supports to said weighing device.

4. In an instrument of the class described, a sample drying oven, a source of heat therein, means for automatically regulating the temperature of said oven, means for artificially accelerating the circulation of the heated air in said oven, a revoluble support having a plurality of sample containers extending in said oven, and means whereby said support may be rotated to selectively present any one of said sample containers to a weighing device.

5. In an instrument of the class described, a sample drying oven, an electrical heater therein, a thermostat for automatically regulating the temperature of said oven, a circulating fan for artificially accelerating the circulation of the heated air in said oven, a revoluble support having a plurality of sample containers extending in said oven, and a hand wheel for revolving said support to selectively present any one of said sample containers to a weighing device.

6. A sample holder for a testing instrument of the class described comprising a revoluble spider having radially extending arms grooved circumferentially at their free ends, a hand wheel for rotating said spider, and a sample container having detachable engagement with the grooves in the free ends of said spider, said arms also slotted longitudinally to permit entrance of a hook member to raise or detach the containers from the arms.

In testimony whereof I affix my signature in presence of two witnesses.

CHARLES J. EMERSON.

Witnesses:
VICTORIA LOWDEN,
MARION C. HOBBS.